(12) United States Patent
Schweighart et al.

(10) Patent No.: US 8,210,473 B2
(45) Date of Patent: Jul. 3, 2012

(54) FOLDING WING ROOT MECHANISM

(75) Inventors: Samuel Adam Schweighart, Watertown, MA (US); Carl Curtis Dietrich, Woburn, MA (US); Andrew Heafitz, Cambridge, MA (US)

(73) Assignee: Terrafugia, Inc., Woburn, MA (US)

( * ) Notice: Subject to any disclaimer, the term of this patent is extended or adjusted under 35 U.S.C. 154(b) by 741 days.

(21) Appl. No.: 12/177,862

(22) Filed: Jul. 22, 2008

(65) Prior Publication Data

US 2010/0019080 A1 Jan. 28, 2010

(51) Int. Cl.
*B64C 3/56* (2006.01)
(52) U.S. Cl. .................. 244/49; 244/99.2; 244/99.3
(58) Field of Classification Search ................. 244/2, 49, 244/99.2, 99.3, 131, 3.27
See application file for complete search history.

(56) References Cited

U.S. PATENT DOCUMENTS

| | | | | |
|---|---|---|---|---|
| 2,166,564 A | * | 7/1939 | Pavlecka et al. | 244/49 |
| 2,280,809 A | * | 4/1942 | Evans | 116/285 |
| 2,289,224 A | * | 7/1942 | Anderson et al. | 244/49 |
| 2,290,850 A | * | 7/1942 | Umschweif | 244/49 |
| 2,538,602 A | * | 1/1951 | Taylor et al. | 244/49 |
| 2,712,421 A | * | 7/1955 | Naumann | 244/49 |
| 2,972,898 A | * | 2/1961 | Hartel | 74/105 |
| 5,201,479 A | * | 4/1993 | Renzelmann | 244/49 |
| 5,310,138 A | * | 5/1994 | Fitzgibbon | 244/49 |
| 5,350,135 A | * | 9/1994 | Renzelmann et al. | 244/49 |
| 5,381,986 A | * | 1/1995 | Smith et al. | 244/49 |
| 5,427,329 A | * | 6/1995 | Renzelmann et al. | 244/49 |
| 5,452,643 A | * | 9/1995 | Smith et al. | 91/382 |
| 5,558,299 A | * | 9/1996 | Veile | 244/49 |
| 2010/0051742 A1 | * | 3/2010 | Schweighart et al. | 244/49 |
| 2010/0230532 A1 | * | 9/2010 | Dietrich et al. | 244/49 |

* cited by examiner

*Primary Examiner* — Tien Dinh
*Assistant Examiner* — Philip J Bonzell
(74) *Attorney, Agent, or Firm* — Goodwin Procter LLP

(57) ABSTRACT

Improvements to the hinge of a folding aircraft wing including a load bearing hinge mechanism with multiple locking mechanisms. The mechanism includes rigid panels that cover the hinge area when the wing is deployed, and the wing itself covers the hinge area when the wing is retracted. A control lever is used to actuate the wing and incorporates safety features to prevent unwanted actuation.

8 Claims, 2 Drawing Sheets

FOLDING WING ROOT MECHANISM

FEDERALLY SPONSORED RESEARCH

Not Applicable

SEQUENCE LISTING OR PROGRAM

Not Applicable

FIELD OF THE INVENTION

This invention relates to aircraft and to roadable aircraft, a type of aircraft that can be converted into an automotive type vehicle capable of driving on the road, sometimes popularly referred to as a "flying car" or "flying-driving vehicle".

BACKGROUND OF THE INVENTION

This invention, though extensible to a broader spectrum of applications, was motivated by the development of a roadable aircraft. One of the challenges of developing a practical roadable aircraft is how to safely and securely stow the wings while operating in the road environment. Conveniently stowing a roadable or non-roadable aircraft's wings for storage could be accomplished with the same or similar techniques. This invention represents an improved method for accomplishing this.

A common method for stowing the wings of a roadable aircraft described in prior art is to rotate the wings into an orientation parallel to the fuselage of the aircraft. This is the approach taken in broad terms by Geisse (U.S. Pat. No. 2,424,068), Spitzer (U.S. Pat. No. 6,082,665), Pellarini (U.S. Pat. No. 2,674,422), Pham (U.S. Pat. No. 5,984,228), and Bragg (U.S. Pat. No. 6,086,014), among others. Some of the prior art does combine a fold with this rotation. The bi-fold invention described here improves upon this technique by reducing the side area of the vehicle on the road, thus improving safety in high-wind conditions; and by protecting more of the flight surface against potential damage from road debris. Additionally, a bi-folding wing can have a greater span while still allowing the roadable configuration of the aircraft to fit in a standard automotive parking space.

The bi-fold invention described here has many of the same advantages over the single fold wing designs common in naval military aircraft, such as the invention of Naumann (U.S. Pat. No. 2,712,421). A prior bi-fold wing design has been proposed by Schertz (U.S. Pat. No. 3,371,886) in which the wing hinges at the top of the airfoil at both the root and at the mid-span. The invention described here improves upon Schertz in part by folding from the bottom of the airfoil. This results in a more compact design which requires less volume to actuate and that offers superior protection to the hinge in the root of the wing as it is not exposed to the ground.

Other prior methods include wings that combine rotation and folding mechanisms. An example of this style is seen in the concept put forth by Bragg (U.S. Pat. No. 6,086,014). The complicated nature of this combined style necessitates either manual operation or a heavier and more complicated actuation system than is put forth in this invention. Manual operation of the wing folding and unfolding process has proven to be commercially undesirable.

The invention described here improves upon many of the detailed elements of the prior art as well as the basic configuration of the stowed wings. For optimum aerodynamic performance and protection of key mechanisms in both the stowed and deployed configuration, this invention improves upon the fairing panels described by Paez (U.S. Pat. No. 5,372,336) by providing a fair surface in both configurations. Also, instead of adding an additional third rigid component to fair the wing surface only in the deployed configuration, this invention simplifies the fairing by using two panels connected to the fuselage and inboard wing section. The panel fairing technique presented here is an improvement for roadable applications over the elastomeric fairing proposed by Gruensfelder (U.S. Pat. No. 6,076,766) as it provides a more durable and cost-effective method of fairing the surface of the structure.

Any safe folding wing mechanism must also include a method by which the wings are secured in place in both its folded and deployed configurations. In the prior art, this is often accomplished through the use of locking pins. This method is seen in both military and roadable aircraft folding wing mechanisms. See Veile (U.S. Pat. No. 5,558,229) and Spitzer (U.S. Pat. No. 6,082,665) for an example of each. The invention described here is an improvement on previous wing locking techniques as it allows a quick, simple, direct visible and tactile check of the locking mechanism before flight by the pilot to ensure safe operation.

The locking and unlocking mechanisms are activated by the same automated process as the wing folding and deployment, thus eliminating the need for secondary mechanisms. This is an improvement over inventions such as that described by Pham (U.S. Pat. No. 6,129,306) in which a pin is inserted for flight and a bungee cord is required to secure the wings when stowed. By eliminating sliding components in the wing root, the potential for debris to interfere with the folding and locking operation is significantly reduced. The wing locks described in this invention are an improvement over prior art in that they are both safer and more convenient than previous roadable aircraft locking mechanisms while being simpler and lighter weight than military wing locking devices.

In broad terms, when used in the preferred embodiment, the invention presented here represents part of a more elegant and more commercially viable solution to the challenge of folding the wings on a roadable aircraft for ground use than those previously conceived.

SUMMARY OF THE INVENTION

The invention covers improvements to the root-wing hinge area of a bi-fold aircraft wing including a load bearing hinge mechanism with multiple locking mechanisms. While the preferred embodiment is the use of these mechanisms at the root fold in a bi-fold wing for a roadable aircraft, aspects of this invention can be applied to single-fold and non-roadable applications.

The inner wing section is hinged to the vehicle along the bottom skin of the wing. Hinging at the bottom has advantages compared to hinging along the top of the wing. For example: the span of the wing can be longer for a given stowed wing size, and the folding mechanism can be made easily protected from the elements. The loads from the wing spar are transmitted to the body of the vehicle through the hinge on the bottom of the wing, and a retractable linkage on the top skin of the wing. A single linear actuator acting on the linkage can retract or deploy the wing, and in the deployed position, the linkage moves to an over-top-dead-center position, so wing load forces hold the linkage in the deployed position. Also there is a secondary locking mechanism preventing the linkage from folding, and the actuator is non-backdrivable. These three mechanisms provide a high level of confidence that the wing will not accidentally retract during flight activities. Another improvement embodied in this linkage is the ability of the pilot to perform both a direct visual and direct tactile check on its being in the locked position during the course of a standard pre-flight inspection of the aircraft. Furthermore, the wing has rigid panels that cover the hinge area when the wing is deployed, and the wing itself covers the hinge area when the wing is retracted. This is an improvement on other mechanisms because the vehicle is left with clean lines and a sealed hinge mechanism in both the retracted and deployed positions. Frequently folding wings leave exposed mechanism and open gaps in the retracted position.

NUMBERED COMPONENTS IN THE DRAWINGS

5. Hinge Link No. 1
6. Hinge Link No. 2
7. Hinge Link No. 3
8. Hinge Link No. 4
9. Lower Hinge Base
10. Lower Hinge Wing Side
11. Lower Hinge Pin
12. Upper Hinge Pin No. 1
13. Upper Hinge Pin No. 2
14. Upper Hinge Pin No. 3
24. Aircraft Body
25. Front Cover Panel
26. Mid Cover Panel
27. Rear Cover Panel
28. Spar Web
30. Over-Center Lock
31. Stop
32. Actuator Pivot
33. Actuator
34. Spring
35. Cable
36. Pivot
50. Inner Wing

DETAILED DESCRIPTION OF THE INVENTION

Figure 1:
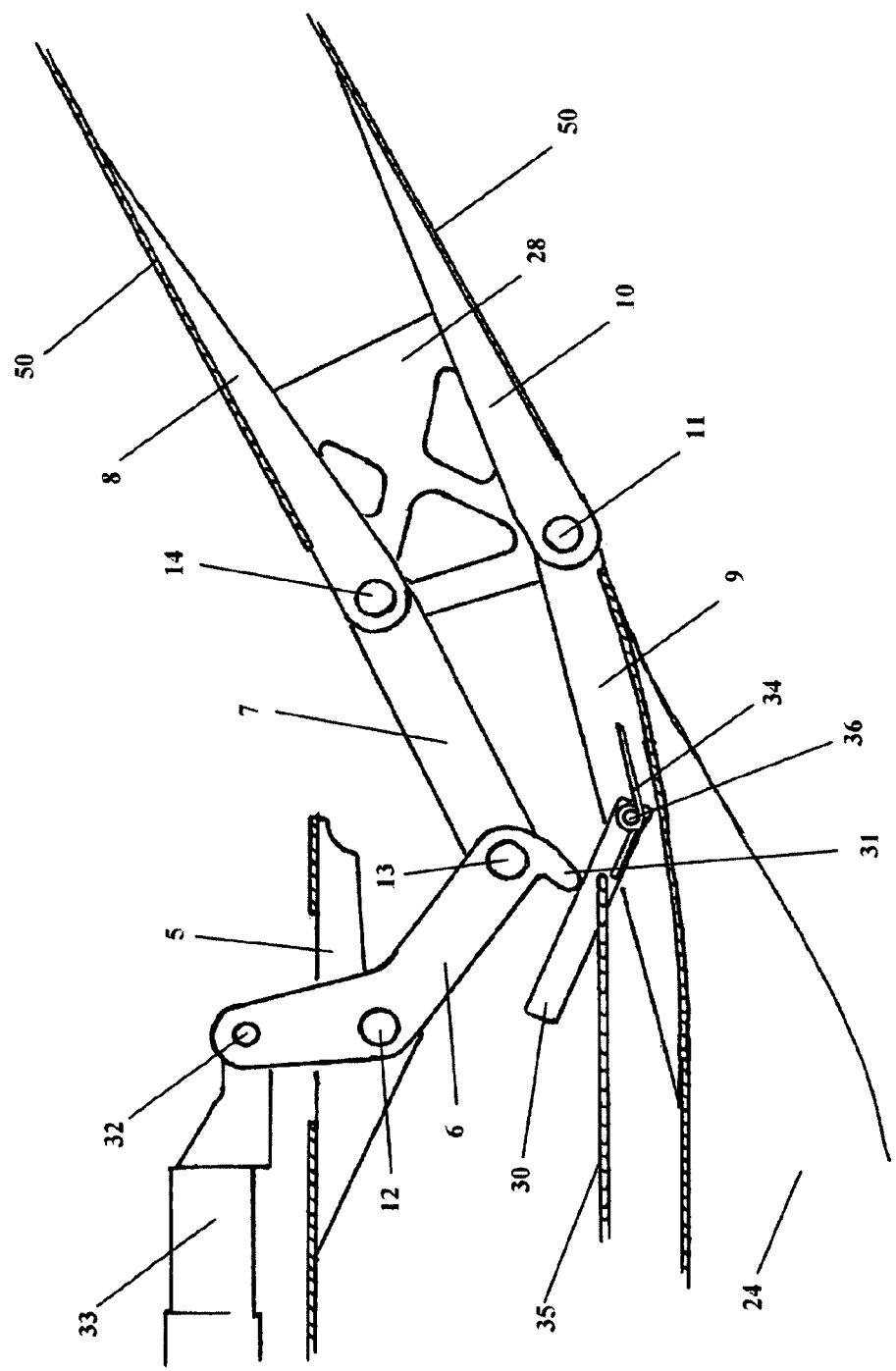
FIG. 1 is a schematic cross sectional side view of the hinge mechanism.

FIG. 1 shows the wing folding mechanism. In the preferred embodiment inner wing (50) is attached rigidly to hinge link no. 4 (8) and lower hinge wing side (10). Aircraft body (24) from which said wing will fold is mounted rigidly to hinge link no. 1 (5) and lower hinge base (9). Lower hinge base (9) and lower hinge wing side (10) are connected with lower hinge pin (11) so that the wing, attached to lower hinge wing side (10) can rotate about the axis created by lower hinge pin (11). The top half of the hinge mechanism consists of hinge link no. 1 (5) which is rigidly attached to the vehicle. Hinge link no. 2 (6) is allowed to rotate with respect to hinge link no 1 (5) using upper hinge pin no. 1 (12). The opposite end of hinge link no. 2 (6) is attached to hinge link no. 3 (7) with another hinge pin, upper hinge pin no. 2 (13). Hinge link no. 3 (7) is allowed to rotate with respect to upper hinge pin no. 2 (13), and is connected to hinge link no. 4 (8) with another hinge pin, upper hinge pin no. 3 (14). Hinge link no. 4 (8) is rigidly connected to lower hinge wing side (10) with spar web (28); all three move with inner wing (50). Actuator pivot (32) is a rigid extension of hinge link no. 2 (6), and actuator pivot (32) has a pivoting connection to actuator (33). Over-center lock (30) can rotate about pivot (36), and stop (31) is a fixed stop rigidly attached to hinge link no. 2 (6).

The operation of the wing folding mechanism is as follows: To extend the wing from a retracted position the actuator (33) pulls on the actuator pivot (32), which moves to the left causing hinge link no. 2 (6) to rotate in a counterclockwise manner about upper hinge pin 2 (12). Since hinge link no. 4 (8) and lower hinge wing side (10) are rigidly linked through spar web (28), as hinge link no. 2 (6) pushes upper hinge pin no. 2 (13) towards the right, upper hinge pin no. 3 (14) traces a circular path clockwise about lower hinge pin (11). The resulting rotation of hinge link no. 4 (8) and lower hinge wing side (10) rotates inner wing (50) clockwise from the retracted position to the extended position.

Once inner wing (50) is extended, hinge link no. 2 (6) has rotated to a position over top-dead-center, so positive wing lift forces which are transmitted as compressive forces through hinge link no. 4 (8) and then hinge link no. 3 (7) into hinge link no. 2 (6) tend to push (6) upwards. Since hinge link no. 2 (6), specifically the end of (6) containing upper hinge pin no. 2 (13) is in contact with hinge link no. 1 (5), (6) is not able to rotate counter clockwise further and the wing is prevented from folding back into the retracted position as a result of positive wing lifting forces. Actuator (33) is non-back drivable, and will resist this motion. In the event of negative wing lifting forces, for example those that might be generated during turbulence or acrobatic maneuvers, hinge link no. 4 (8) and hinge link no. 3 (7) will be in tension. Hinge link no. 2 (6) will have a force causing it to rotate from over-top-dead-center, towards top-dead-center.

Additionally, actuator (33) is non-back drivable, and will resist this motion. Also, over-center lock (30) is pushed to a vertical position by spring (34) and retained in position by stop (31), which also prevents excessive clockwise motion of hinge link no. 2 (6). Once positive wing lifting forces have returned, hinge link no. 2 (6) will return to over-top-dead-center. In both positive and negative wing loading conditions, there are at least two independent mechanisms that prevent the wing from rotating into the retracted condition accidentally.

To retract the wing, a cable (35) is used to rotate over-center lock (30) out of its locked position in contact with stop (31). The actuator (33) then pushes actuator pivot (32) to the right, causing hinge link no. 2 (6) to rotate clockwise about upper hinge pin (12). Upper hinge pin no. 3 (13) pulls hinge link no. 3 (7) which pulls upper hinge pin no.3 (14) which causes hinge link no. 4 (8) to rotate counterclockwise about lower hinge pin (11) which rotates the wing counterclockwise into the retracted position. Once hinge link no. (6) starts its rotation, stop (31) pushes over-center lock (30) farther out of the way causing it to continue to rotate counterclockwise about pivot (36). Over-center lock (30) remains biased towards the locked position with spring (34).

Figure 2:
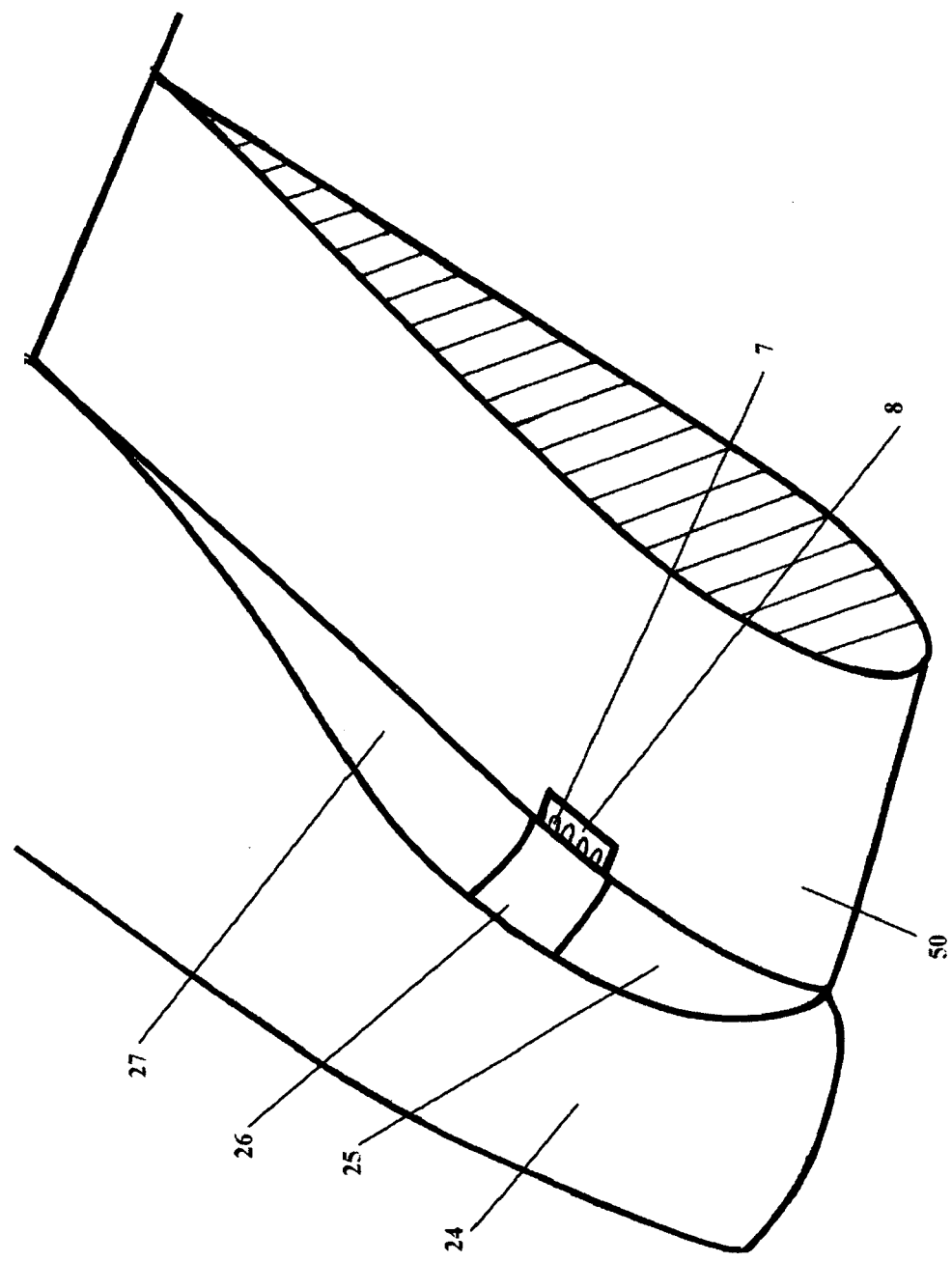
FIG. 2 is a schematic of the exterior of the root of the wing with the fairing panels in place.

FIG. 2 shows the panels that cover the wing folding mechanism. Front cover panel (25) and rear cover panel (27) are rigidly affixed to inner wing (50). Mid cover panel (26) is rigidly affixed to hinge link no. 3 (7). Both hinge link no. 3 (7) and hinge link no. 4 (8) are links in the hinge mechanism connecting inner wing (50) to aircraft body (24) and shown in FIG. 1.

In FIG. 2, when inner wing (50) is in the extended position in relation to aircraft body (24), front cover panel (25) and rear cover panel (27) create a flush seal to aircraft body (24) and serve to cover the area with the wing folding mechanism, and the area cut out of aircraft body (24) where inner wing (50) will nest when it is in the folded position. During the folding process, mid cover panel (26) dives down first, as hinge link no. 3 (7) moves downwards. (The motion of hinge link no. 3 (7) is fully described in FIG. 1.) As inner wing (50) rotates counterclockwise, front cover panel (25) and rear cover panel (27) also rotate counterclockwise, revealing a cutout in aircraft body (24) that is the same shape as the top surface of inner wing (50). When inner wing (50) is fully retracted, the top surface rests up against the exposed edge of aircraft body (24), again sealing the gap between inner wing (50) and aircraft body (24), and protecting the hinge mechanism. In this manner the hinge mechanism is protected and sealed with a hard covering in both the retracted and deployed positions.

We claim:

1. A wing folding mechanism comprising:
   a) a first wing section,
   b) at least one of a vehicle and a second wing section,
   c) a hinge connecting the first wing section to at least one of the vehicle and the second wing section, wherein the hinge defines a hinge pivot axis disposed proximate at least one of a top surface and a bottom surface of the first wing section,
   d) a first stationary linkage located on at least one of the vehicle and the second wing section, the first linkage defining a first stationary pivot axis that is substantially parallel to but not co-linear with the hinge pivot axis,
   e) a second linkage joined to the first linkage along the first pivot axis,
   f) a third linkage joined to the second linkage along a second pivot axis that is substantially parallel to but not co-linear with the first pivot axis and the hinge pivot axis,
   g) a fourth linkage connected to the third linkage along a third pivot axis that is substantially parallel to but not co-linear with any of the second pivot axis, the first pivot axis, and the hinge pivot axis, and connected to the first wing section, and
   h) an actuator connected to the second linkage, wherein the actuator is adapted to rotate the second linkage so that the second pivot axis is positionable in an over top-dead-center location.

2. The mechanism of claim 1, wherein the actuator is selected from the group consisting of a rotary actuator, a linear actuator, a manual actuator, and combinations thereof.

3. The mechanism of claim 1, wherein the second linkage and the third linkage are adapted to cause the first wing section to fold when the second linkage and the third linkage are moved in an upward direction.

4. The mechanism of claim 1, wherein the second linkage and the third linkage are adapted to cause the first wing section to fold when the second linkage and the third linkage are moved in a downward direction.

5. The mechanism of claim 1 further comprising a lock, wherein the lock is adapted to restrict motion of at least one of the second linkage and the third linkage when the second pivot axis is positioned in the over top dead center location.

6. The mechanism of claim 5, wherein the second linkage comprises a mechanical stop adapted to contact the lock.

7. The mechanism of claim 6 further comprising a means to bias the lock against the mechanical stop.

8. The mechanism of claim 7 further comprising means to displace the lock from the mechanical stop.

* * * * *